United States Patent
Ahn et al.

(10) Patent No.: US 11,637,274 B2
(45) Date of Patent: Apr. 25, 2023

(54) STRIP-SHAPED ELECTRODE USED FOR CYLINDRICAL JELLY ROLL AND LITHIUM SECONDARY BATTERY COMPRISING SAME

(71) Applicant: LG CHEM, LTD., Seoul (KR)

(72) Inventors: Byoung-Hoon Ahn, Daejeon (KR); Jung-Min Yang, Daejeon (KR); Sang-Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 286 days.

(21) Appl. No.: 16/610,644

(22) PCT Filed: Nov. 9, 2018

(86) PCT No.: PCT/KR2018/013671
§ 371 (c)(1),
(2) Date: Nov. 4, 2019

(87) PCT Pub. No.: WO2019/093836
PCT Pub. Date: May 16, 2019

(65) Prior Publication Data
US 2020/0067071 A1    Feb. 27, 2020

(30) Foreign Application Priority Data
Nov. 9, 2017   (KR) .................. 10-2017-0148955

(51) Int. Cl.
*H01M 4/13*   (2010.01)
*H01M 4/36*   (2006.01)
(Continued)

(52) U.S. Cl.
CPC ............. *H01M 4/13* (2013.01); *H01M 4/366* (2013.01); *H01M 10/052* (2013.01); *H01M 10/0587* (2013.01)

(58) Field of Classification Search
CPC ...... H01M 4/13; H01M 4/366; H01M 10/052; H01M 10/0587; H01M 4/621;
(Continued)

(56) References Cited

U.S. PATENT DOCUMENTS

| 2008/0026288 A1 | 1/2008 | Marple et al. |
| 2013/0230749 A1 | 9/2013 | Kim et al. |

(Continued)

FOREIGN PATENT DOCUMENTS

| CN | 102074380 A | 5/2011 |
| CN | 206098526 U | 4/2017 |

(Continued)

OTHER PUBLICATIONS

International Search Report issued in corresponding International Patent Application No. PCT/KR2018/013671, dated Feb. 19, 2019.

(Continued)

*Primary Examiner* — Cynthia K Walls
(74) *Attorney, Agent, or Firm* — Morgan, Lewis & Bockius LLP

(57) ABSTRACT

The present disclosure relates to a strip-like electrode for use in a cylindrical jelly roll which includes a strip-like electrode assembly wound cylindrically to form a hollow cavity at the core portion thereof, and a lithium secondary battery including the same. The strip-like electrode includes: a strip-like electrode current collector; a first electrode active material layer formed on at least one surface of the strip-like electrode current collector; and a second electrode active material layer formed on the first electrode active material layer, wherein the second electrode active material layer is formed to have a length smaller than the length of the first electrode active material layer so that a part of one longitudinal surface of the first electrode active material layer can be exposed to the outside.

14 Claims, 2 Drawing Sheets

(51) Int. Cl.
*H01M 10/052* (2010.01)
*H01M 10/0587* (2010.01)

(58) Field of Classification Search
CPC ......... H01M 2220/30; H01M 10/0431; H01M 4/131; H01M 10/0525; Y02P 70/50; Y02E 60/10
See application file for complete search history.

(56) References Cited

U.S. PATENT DOCUMENTS

| | | | |
|---|---|---|---|
| 2015/0037637 A1 | 2/2015 | Mun | |
| 2015/0104701 A1* | 4/2015 | Azami | H01M 4/505 429/188 |
| 2016/0294015 A1* | 10/2016 | Tanaka | H01M 4/13 |
| 2020/0058962 A1 | 2/2020 | Kim et al. | |

FOREIGN PATENT DOCUMENTS

| | | |
|---|---|---|
| CN | 107302110 A | 10/2017 |
| DE | 102011004932 A1 | 9/2012 |
| EP | 3522282 A1 | 8/2019 |
| JP | 3482443 B2 | 12/2003 |
| JP | 2004-303622 A | 10/2004 |
| JP | 2009-181833 A | 8/2009 |
| JP | 2011-138729 A | 7/2011 |
| JP | 2011-192539 A | 9/2011 |
| JP | 2011-216297 A | 10/2011 |
| JP | 2014-211944 A | 11/2014 |
| KR | 10-2004-0037577 A | 5/2004 |
| KR | 10-2006-0010658 A | 2/2006 |
| KR | 10-2009-0035704 A | 4/2009 |
| KR | 10-2012-0086270 A | 8/2012 |
| KR | 10-2013-0071935 A | 7/2013 |
| KR | 10-2014-0070259 A | 6/2014 |
| KR | 10-2014-0137660 A | 12/2014 |
| KR | 10-2015-0015253 A | 2/2015 |
| KR | 10-2015-0034521 A | 4/2015 |
| KR | 10-2015-0049519 A | 5/2015 |
| KR | 10-2015-0049996 A | 5/2015 |
| KR | 10-1636451 B1 | 7/2016 |

OTHER PUBLICATIONS

Extended European Search Report issued from the European Patent Office dated Jun. 4, 2020 in corresponding European patent application No. 18876057.3.

* cited by examiner

-Related Art-

-Related Art-

STRIP-SHAPED ELECTRODE USED FOR CYLINDRICAL JELLY ROLL AND LITHIUM SECONDARY BATTERY COMPRISING SAME

TECHNICAL FIELD

The present application claims priority to Korean Patent Application No. 10-2017-0148955 filed on Nov. 9, 2017 in the Republic of Korea, the disclosures of which are incorporated herein by reference.

The present disclosure relates to a strip-like electrode for use in a cylindrical jelly roll and a lithium secondary battery including the same.

BACKGROUND ART

As technological development and demand for mobile instruments have been increased, secondary batteries as energy sources are increasingly in demand. Among such secondary batteries, many studies have been conducted about lithium secondary batteries having high energy density and discharge voltage, and such lithium secondary batteries have been commercialized and used widely.

Secondary batteries are classified, depending on shapes of battery casings, into cylindrical batteries and prismatic batteries, wherein an electrode assembly is received in a cylindrical or prismatic metallic can, respectively, and pouch-type batteries, wherein an electrode assembly is received in a pouch-type casing made of an aluminum laminate sheet.

In addition, the electrode assembly received in the battery casing is a power generation device capable of charging/discharging and including a stacked structure of positive electrode (cathode)/separator/negative electrode (anode). Such electrode assemblies are largely classified into jelly roll types formed by interposing a separator between an elongated strip-like positive electrode and negative electrode coated with an active material and winding them, stack types formed by stacking a plurality of positive electrodes and negative electrodes having a predetermined size with separators interposed between a positive electrode and a negative electrode, and stacked and folded types formed by winding stack type unit cells with a long separator film. Among them, jelly roll type electrode assemblies are advantageous in that they are manufactured most easily and have high energy density per weight.

In the jelly roll electrode assembly, a strip-like electrode assembly including a stack of a strip-like positive electrode, a strip-like separator and a strip-like negative electrode is wound in a cylindrical shape, or the like.

Meanwhile, it is required to provide a high-loading electrode, since high capacity characteristics have been required recently. When such a high-loading electrode is applied to a cylindrical battery, cracking occurs on the electrode coating layer at the core portion to cause a serious problem.

DISCLOSURE

Technical Problem

The present disclosure is directed to providing a strip-like electrode which solves the problem of cracking that may occur in the electrode coating layer at the core portion of a cylindrical jelly roll while preventing degradation of the performance of a lithium secondary battery, and a lithium secondary battery including the same.

Technical Solution

According to the first embodiment of the present disclosure, there is provided a strip-like electrode for use in a cylindrical jelly roll which includes a strip-like electrode assembly wound cylindrically to form a hollow cavity at the core portion thereof, the strip-like electrode including: a strip-like electrode current collector; a first electrode active material layer formed on at least one surface of the strip-like electrode current collector; and a second electrode active material layer formed on the first electrode active material layer, wherein the second electrode active material layer is formed to have a length smaller than the length of the first electrode active material layer so that a part of one longitudinal surface of the first electrode active material layer may be exposed to the outside.

According to the second embodiment of the present disclosure, there is provided the strip-like electrode as defined in the first embodiment, wherein the first electrode active material layer is formed to have a length smaller than the length of the strip-like electrode current collector so that a part of one longitudinal surface of the strip-like electrode current collector may be exposed to the outside.

According to the third embodiment of the present disclosure, there is provided the strip-like electrode as defined in the first or the second embodiment, wherein the thickness of the first electrode active material layer and that of the second electrode active material layer are formed to have a ratio of from 1:9 to 7:3.

According to the fourth embodiment of the present disclosure, there is provided the strip-like electrode as defined in any one of the first to the third embodiments, wherein the thickness of the first electrode active material layer and that of the second electrode active material layer are formed to have a ratio of from 3:7 to 6:4.

According to the fifth embodiment of the present disclosure, there is provided a lithium secondary battery including a cylindrical jelly roll having a strip-like electrode assembly wound cylindrically to form a hollow cavity at the core portion, wherein the strip-like electrode assembly has a structure including a strip-like positive electrode, a strip-like separator and a strip-like negative electrode stacked sequentially, and the strip-like positive electrode or the strip-like negative electrode is the strip-like electrode as defined in any one of the first to the fourth embodiments.

According to the sixth embodiment of the present disclosure, there is provided the lithium secondary battery as defined in the fifth embodiment, wherein the cylindrical jelly roll is wound in a manner that one portion of the strip-like electrode assembly at which the first electrode active material layer is exposed is positioned at the core portion of the cylindrical jelly roll.

According to the seventh embodiment of the present disclosure, there is provided the lithium secondary battery as defined in the fifth or the sixth embodiment, which further includes a center pin inserted into the core portion of the cylindrical jelly roll.

According to the eighth embodiment of the present disclosure, there is provided the lithium secondary battery as defined in any one of the fifth to the seventh embodiments, wherein the length of the surface of the first electrode active material layer exposed to the outside is from 1 to 3 times of the length of the circumference of the center pin.

According to the ninth embodiment of the present disclosure, there is provided the lithium secondary battery as defined in any one of the fifth to the eighth embodiments, wherein each of the first electrode active material layer and the second electrode active material layer includes a binder, and the binder contained in the first electrode active material layer and the binder contained in the second electrode active material layer are present at a weight ratio of from 90:10 to 60:40.

According to the tenth embodiment of the present disclosure, there is provided the lithium secondary battery as defined in any one of the fifth to the ninth embodiments, wherein the strip-like electrode is a strip-like positive electrode.

Advantageous Effects

The strip-like electrode according to the present disclosure has at least two electrode active material layers having a different area in which an active material is formed. In addition, a portion of the strip-like electrode positioned at the core portion of the cylindrical jelly roll, such as a portion of the strip-like electrode wound on the circumference of the center pin 1-3 times, has a smaller thickness. Thus, it is possible to reduce the loading amount and press rate at the core portion of the cylindrical jelly roll. As a result, it is possible to prevent cracking in the strip-like electrode positioned at the core portion of the cylindrical jelly roll.

In addition, in the strip-like electrode according to the present disclosure, the portion other than the portion having a relatively smaller thickness has a relatively larger thickness through high loading. Thus, it is possible to meet a recent need for secondary batteries having high capacity characteristics.

Further, according to an embodiment of the present disclosure, it is possible to provide excellent binding force between an electrode current collector and an electrode active material layer in a high-loading type strip-like electrode, while maintaining excellent electroconductivity of a lithium secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
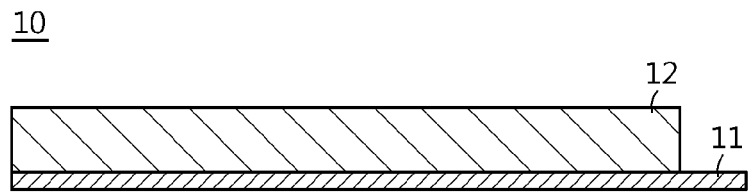
FIG. 1 is a schematic sectional view illustrating a strip-like electrode having one electrode active material layer according to the related art.
Figure 2:
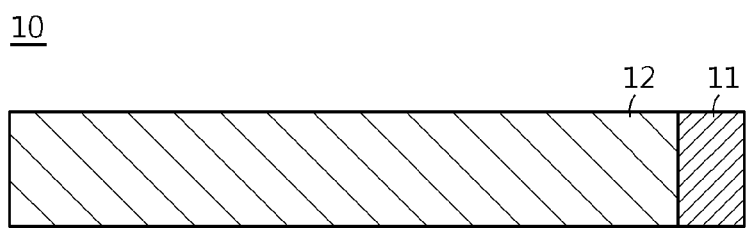
FIG. 2 is a schematic top view illustrating a strip-like electrode having one electrode active material layer according to the related art.

FIGS. 1 and 2 are a schematic sectional view and schematic top view illustrating the strip-like electrode having an electrode active material layer according to the related art.

Referring to FIGS. 1 and 2, a single electrode active material layer 12 having a uniform thickness is formed on a strip-like electrode current collector 11. When a cylindrical jelly roll is formed subsequently by using the strip-like electrode 10, cracking may occur in the electrode active material layer at the portion corresponding to the core portion of the cylindrical jelly roll. Such a problem tends to become more serious in the case of a high-loading electrode having an electrode active material layer with a larger thickness.

Figure 3:
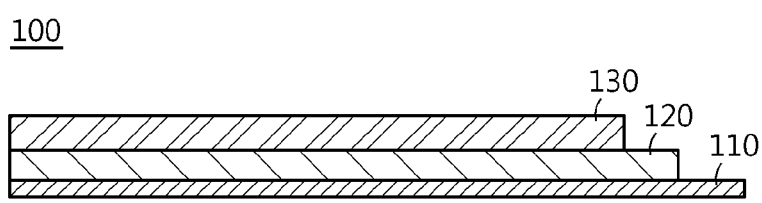
FIG. 3 is a schematic sectional view illustrating a strip-like electrode having two electrode active material layers according to an embodiment of the present disclosure.
Figure 4:
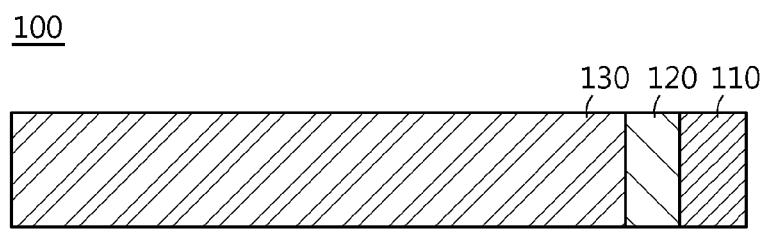
FIG. 4 is a schematic top view illustrating a strip-like electrode having two electrode active material layers according to an embodiment of the present disclosure.

FIGS. 3 and 4 are a schematic sectional view and schematic top view illustrating the strip-like electrode having two electrode active material layers according to an embodiment of the present disclosure.

Referring to FIGS. 3 and 4, the strip-like electrode 100 according to an embodiment of the present disclosure for a cylindrical jelly roll which includes a strip-like electrode assembly wound cylindrically to form a hollow cavity at the core portion thereof, the strip-like electrode 100 including: a strip-like electrode current collector 110; a first electrode active material layer 120 formed on at least one surface of the strip-like electrode current collector 110; and a second electrode active material layer 130 formed on the first electrode active material layer 120, wherein the second electrode active material layer 130 is formed to have a length smaller than the length of the first electrode active material layer 120, resulting in a part of one longitudinal surface of the first electrode active material layer 120 being exposed to the outside.

According to the present disclosure, since the strip-like electrode has two electrode active material layers having a different area of electrode active material, it is possible to provide the electrode active material layer formed in the portion of the strip-like electrode positioned at the core portion of the cylindrical jelly roll with a smaller coating thickness. Thus, it is possible to reduce the loading amount and press rate at the core portion of the cylindrical jelly roll, thereby preventing cracking at the core portion.

According to an embodiment of the present disclosure, the first electrode active material layer 120 may be formed to have a length smaller than the length of the strip-like electrode current collector 110 so that a part of one longitudinal surface of the strip-like electrode current collector 110 may be exposed to the outside. Then, an electrode tab may be attached to the surface of the strip-like electrode current collector 110 exposed to the outside.

Meanwhile, according to another embodiment of the present disclosure, the thickness of the first electrode active material layer 120 and that of the second electrode active material layer 130 may be formed to have a ratio of from 1:9 to 7:3, or 3:7 to 6:4. When the first electrode active material layer is formed to have an excessively smaller thickness below the above-defined range, coating processability of the electrode active material layer may be degraded undesirably. When the first electrode active material layer is formed to have an excessively large thickness beyond the above-defined range, the effect of preventing cracking at the core portion of the cylindrical jelly roll may be degraded undesirably.

Meanwhile, the total thickness of the first electrode active material layer and the second electrode active material layer may be similar to the thickness of a conventional electrode active material layer. More particularly, the electrode active material layer may have a total thickness of 10-300 μm.

In addition, the strip-like electrode may be a positive electrode or negative electrode, and is preferably an electrode using a high-loading amount of active material. The electrode with high-loading active material may be a positive electrode.

Herein, the positive electrode, negative electrode and the separator forming the electrode assembly may be manufactured by the conventional methods using components used for manufacturing lithium secondary batteries.

According to an embodiment of the present disclosure, the positive electrode may be obtained by forming the first positive electrode active material layer and the second positive electrode active material layer on a positive electrode current collector in a way that they form a step. In other words, the slurry for the first positive electrode active material layer including a positive electrode active material, a binder, a conductive material and a solvent and the slurry for the second positive electrode active material layer including a positive electrode active material, a binder, a conductive material and a solvent are prepared individually, the slurry for the first positive electrode active material layer is coated onto an electrode current collector, followed by drying and pressing, and then the slurry for the second positive electrode active material layer is coated onto the first positive electrode active material layer in a manner that the length of the second electrode active material layer has a smaller length than that of the first electrode active material layer, followed by drying and pressing. In this manner, a positive electrode is obtained.

The positive electrode current collector is not particularly limited, as long as it causes no chemical change in the corresponding battery and it has conductivity. Non-limiting examples of the positive electrode current collector may include stainless steel; aluminum; nickel; titanium; baked carbon; aluminium or stainless steel surface-treated with carbon, nickel, titanium or silver; or the like.

In addition, the positive electrode active material may include a lithium transition metal oxide represented by the following Chemical Formula 1:

$$Li(Ni_aCo_bMn_c)O_2 \qquad \text{[Chemical Formula 1]}$$

wherein $0.55 \le a \le 0.9$, $0.05 \le b \le 0.22$, $0.05 \le c \le 0.23$, and $a+b+c=1$.

Typical examples of the positive electrode active material include $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.1}Co_{0.1})O_2$.

In addition to the lithium transition metal oxide represented by Chemical Formula 1, the positive electrode active material may include at least one compound selected from lithium-manganese oxides (e.g. $LiMnO_2$, $LiMn_2O_4$, etc.), lithium-cobalt oxides (e.g., $LiCoO_2$, etc.), lithium-nickel oxides (e.g., $LiNiO_2$, etc.), lithium-nickel-manganese oxides (e.g., $LiNi_{1-Y}Mn_YO_2$ (wherein $0<Y<1$), $LiMn_{2-Z}Ni_ZO_4$ (wherein $0<Z<2$), etc.), lithium-nickel-cobalt oxides (e.g., $LiNi_{1-Y1}Co_{Y1}O_2$ (wherein $0<Y1<1$), etc.), lithium-manganese-cobalt oxides (e.g., $LiCo_{1-Y2}Mn_{Y2}O_2$ (wherein $0<Y2<1$), $LiMn_{2-Z1}Co_{Z1}O_4$ (wherein $0<Z1<2$), etc.), and lithium-nickel-cobalt-transition metal (M) oxides (e.g., $Li(Ni_{p2}Co_{q2}Mn_{r3}MS_2)O_2$ (wherein M is selected from the group consisting of Al, Fe, V, Cr, Ti, Ta, Mg and Mo, and each of p2, q2, r3 and s2 represents the atomic proportion of each element satisfying $0<p2<1$, $0<q2<1$, $0<r3<1$, $0<s2<1$, and $p2+q2+r3+s2=1$)).

Such positive electrode active materials may include $LiCoO_2$, $LiMnO_2$, $LiNiO_2$, or lithium nickel cobalt aluminum oxides (e.g., $Li(Ni_{0.8}Co_{0.15}Al_{0.05})O_2$, etc.).

The positive electrode active material may be used in an amount of 80-99 wt %, particularly 93-98 wt %, based on the total weight of the solid content in the positive electrode slurry. When the positive electrode active material is used in an amount of 80 wt % or less, energy density is decreased to cause degradation of capacity.

The binder is an ingredient which assists binding between an active material and a conductive material and binding to a current collector. In general, the binder may be added in an amount of 1-30 wt % based on the total weight of the solid content in the positive electrode slurry. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene-butadiene rubber, fluoro-rubber, various copolymers, or the like.

According to an embodiment of the present disclosure, the binder contained in the first positive electrode active material layer and the binder contained in the second positive electrode active material layer may be used at a weight ratio of from 90:10 to 60:40. The binder may migrate while the positive electrode slurry is coated onto a current collector and dried to obtain a positive electrode. For example, the binder distributed at the bottom of the positive electrode slurry, i.e., in the vicinity of the current collector may migrate in a direction toward the positive electrode surface, i.e., away from the current collector. As a result, the binder content at a location where the positive electrode current collector is bound to the positive electrode active material layer is reduced, thereby causing degradation of the adhesion between the positive electrode active material layer and the positive electrode current collector. The above-mentioned problem becomes severe in the case of positive electrode which has high loading active material, thereby a larger thickness of active material layer. Therefore, according to an embodiment of the present disclosure, the first positive electrode active material layer may include a relatively larger amount of binder. However, since the second positive electrode active material layer is not present on the first positive electrode active material layer exposed in the longitudinal direction, migration of the binder is relatively limited, and thus such a larger amount of binder remains in the first positive electrode active material layer. As a result, the binder functions as electric resistance in the first positive electrode active material layer exposed in the longitudinal direction to cause a decrease in electroconductivity of a battery. According to an embodiment of the present disclosure, the binder content in the first positive electrode active material layer and the binder content in the second positive electrode active material layer may be in a range of from 90:10 to 60:40 by weight in order to prevent an excessive increase in electric resistance of the first positive electrode active material layer, while providing a desired level of adhesiveness between the positive electrode current collector and the positive electrode active material layer.

The conductive material is not particularly limited, as long as it causes no chemical change in the corresponding battery and it has conductivity. Non-limiting examples of the conductive material include: carbon powder, such as carbon black, acetylene black, ketjen black, channel black, furnace black, lamp black or thermal black; graphite powder, such as natural graphite, artificial graphite or graphite having a well-developed crystal structure; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

In general, the conductive material may be added in an amount of from 1 to 30 wt % based on the total weight of the solid content in the positive electrode slurry.

Commercially available conductive materials such as acetylene black (available from Chevron Chemical Company, Gulf Oil Company, etc.), Denka black (Denka Singapore Private Limited), ketjen Black EC (available from Armak Company), Vulcan XC-72 (available from Cabot Company), Super P (available from Timcal Company), or the like may be used.

The solvent may include an organic solvent, such as N-methyl-2-pyrrolidone (NMP), and may be used in such an amount capable of providing a desired level of viscosity when the positive electrode active material and optionally the binder and the conductive material are incorporated thereto. For example, the amount of the solvent may be such that a solid content, including the positive electrode active material and optionally the binder and the conductive material, in the positive electrode slurry is form 10 to 70 wt %, preferably from 20 to 60 wt %.

According to an embodiment of the present disclosure, the negative electrode may be obtained by forming the first negative electrode active material layer and the second negative electrode active material layer on a negative electrode current collector in a way that they form a step. In other words, the slurry for the first negative electrode active material layer including a negative electrode active material, a binder, a conductive material and a solvent and the slurry for the second negative electrode active material layer including a negative electrode active material, a binder, a conductive material and a solvent are prepared individually, the slurry for the first negative electrode active material layer is coated onto an electrode current collector, followed by drying and pressing, and then the slurry for the second negative electrode active material layer is coated onto the first negative electrode active material layer in a way that the second negative electrode active material layer has a small length than that of the first negative electrode active material layer, followed by drying and pressing. In this manner, a negative electrode is obtained. The negative electrode current collector generally has a thickness of 3-500 μm.

The negative electrode current collector is not particularly limited, as long as it has high conductivity while not causing any chemical change in the corresponding battery. Particular examples of the negative electrode current collector include copper, stainless steel, aluminum, nickel, titanium, baked carbon, or copper or stainless steel surface-treated with carbon, nickel, titanium, silver, or aluminum-cadmium alloy, or the like. In addition, similarly to the positive electrode current collector, the negative electrode current collector may have fine surface irregularities formed on the surface thereof to increase the adhesion of a negative electrode active material, and may have various shapes, such as a film, sheet, foil, net, porous body, foam or non-woven web body.

In addition, the negative electrode active material may include at least one selected from the group consisting of lithium metal, a carbonaceous material capable of reversible lithium ion intercalation/deintercalation, metal or alloy of metal with lithium, metal composite oxide, material capable of lithium doping/dedoping, and a transition metal oxide.

The carbonaceous material capable of reversible lithium ion intercalation/deintercalation may include any carbonaceous negative electrode active material used generally in a lithium ion secondary battery with no particular limitation. Typical examples of the carbonaceous material include crystalline carbon, amorphous carbon or a combination thereof. Particular examples of the crystalline carbon include graphite, such as amorphous, sheet-like, flake-like, spherical or fibrous natural graphite or artificial graphite, and particular examples of the amorphous carbon include soft carbon (low-temperature baked carbon) or hard carbon, mesophase pitch carbide, baked cokes, or the like.

Particular examples of the metal or alloy of metal with lithium include a metal selected from the group consisting of Cu, Ni, Na, K, Rb, Cs, Fr, Be, Mg, Ca, Sr, Si, Sb, Pb, In, Zn, Ba, Ra, Ge, Al and Sn, and an alloy of such a metal with lithium.

The metal composite oxide that may be used is selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3(0 \leq x \leq 1)$, $Li_xWO_2(0 \leq x \leq 1)$, and $Sn_xMe_{1-x}Me'_yO_z$ (wherein Me is Mn, Fe, Pb, Ge; Me' is Al, B, P, Si, element of Group 1, 2 or 3 in the Periodic Table, halogen; and $0 < x \leq 1$; $1 \leq y \leq 3$; and $1 \leq z \leq 8$).

The material capable of lithium doping/dedoping may include Si, $SiO_x(0 < x < 2)$, Si—Y alloy (wherein Y is an element selected from the group consisting of alkali metals, alkaline earth metals, Group 13 elements, Group 14 elements, transition metals, rare earth elements and combinations thereof, except Si), Sn, $SnO_2$, Sn—Y (wherein Y is an element selected from the group consisting of alkali metals, alkaline earth metals, Group 13 elements, Group 14 elements, transition metals, rare earth elements and combinations thereof, except Sn), or the like. At least one of such materials may be used in combination with $SiO_2$. Element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The binder is an ingredient which assists binding among a conductive material, an active material and a current collector. In general, the binder may be added in an amount of from 1 to 30 wt % based on the total weight of the solid content in the negative electrode slurry. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene tpolymer (EPDM), sulfonated EPDM, styrene-butadiene rubber, fluoro-rubber, various copolymers thereof, or the like.

According to an embodiment of the present disclosure, the content of the binder in the first negative electrode active material layer and that of the binder in the second negative electrode active material layer may be in a range of from 90:10 to 60:40. Similarly to the positive electrode, the binder may migrate while the negative electrode slurry is coated onto a current collector and dried to obtain a negative electrode. For example, the binder distributed at the bottom of the negative electrode slurry, i.e., in the vicinity of the current collector may migrate in a direction toward the negative electrode surface, i.e., away from the current collector. As a result, the binder content at a site where the negative electrode current collector is bound to the negative electrode active material layer diminishes, resulting in degradation of the adhesion between the negative electrode active material layer and the negative electrode current collector. The above-mentioned problem becomes severe in the case of a negative electrode which has a high-loading active material, thereby a larger thickness of active material layer. Therefore, according to an embodiment of the present disclosure, the first negative electrode active material layer may include a relatively larger amount of binder. However, since the second negative electrode active material layer is not present on the first negative electrode active material layer exposed in the longitudinal direction, migration of the binder is relatively limited, and thus such a larger amount of binder is retained in the first negative electrode active material layer. As a result, the binder in the first negative electrode active material layer exposed in the longitudinal direction functions as electric resistance, thereby decreasing in conductivity of a battery. According to an embodiment of the present disclosure, the binder content in the first negative electrode active material layer and the binder content in the second negative electrode active material layer may be in a range of from 90:10 to 60:40 by weight in order to prevent an excessive increase in electric resistance of the first negative electrode active material layer, while providing a desired level of adhesiveness between the negative electrode current collector and the negative electrode active material layer.

The conductive material is an ingredient for further improving the conductivity of the negative electrode active material, and may be added in an amount of 1-20 wt % based on the total weight of the solid content of the negative electrode slurry. The conductive material is not particularly limited, as long as it causes no chemical change in the corresponding battery and has conductivity. Particular examples of the conductive material include: carbon powder, such as carbon black, acetylene black, ketjen black, channel black, furnace black, lamp black or thermal black; graphite powder, such as natural graphite, artificial graphite or graphite having a well-developed crystal structure; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

The solvent may include water or an organic solvent, such as NMP, alcohol, or the like, and may be used in such an amount capable of providing a desired level of viscosity when the negative electrode active material and optionally the binder and the conductive material are incorporated thereto. For example, the solvent may provide a solid content, including the negative electrode active material and optionally the binder and the conductive material, in the negative electrode slurry of 50-75 wt %, preferably 50-65 wt %.

In addition, the separator that may be used includes a conventional porous film used currently as a separator, such as a porous polymer film made of a polyolefin-based polymer, including ethylene homopolymer, propylene homopolymer, ethylene/butene copolymer, ethylene/hexene copolymer or ethylene/methacrylate copolymer, and such porous polymer films may be used alone or in the form of a stack. Otherwise, a conventional porous non-woven web, such as a non-woven web made of high-melting point glass fibers, polyethylene terephthalate fibers, or the like, may be used with no particular limitation.

The transition metal oxide may include lithiated titanium composite oxide (LTO), vanadium oxide, lithium vanadium oxide, or the like.

The negative electrode active material may be used in an amount of 80-90 wt % based on the total weight of the solid content in the negative electrode slurry.

In addition, the first electrode active material layer and the second electrode active material layer may include the same ingredients or different ingredients.

In another aspect of the present disclosure, the electrode assembly may be formed by using three or more electrode active material layers, not two electrode active material layers as mentioned above. Multiple electrode active material layers having a different length may be selected suitably depending on the curvature of a center pin as a winding core member with the proviso that the effect of improving cracking is not adversely affected. In this case, the total thickness of multiple electrode active material layers may be similar to the thickness of a general electrode active material layer. More particularly, the total thickness of the electrode active material layers may be 10-300 μm.

Figure 5:
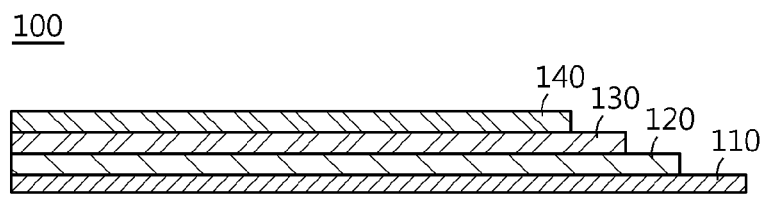
FIG. 5 is a schematic sectional view illustrating a strip-like electrode having three electrode active material layers according to another embodiment of the present disclosure.
Figure 6:
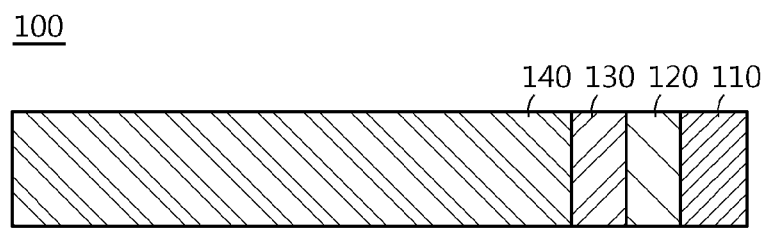
FIG. 6 is a schematic top view illustrating a strip-like electrode having three electrode active material layers according to another embodiment of the present disclosure.

For example, referring to FIGS. 5 and 6, three electrode active material layers 120, 130, 140 are formed sequentially, starting from the strip-like electrode current collector 110. The third electrode active material layer 140 formed at the outermost portion has a length smaller than the length of the second electrode active material layer 130 beneath the third electrode active material layer. In this case, the electrode active material layer in the portion of the strip-like electrode positioned at the core portion of the cylindrical jelly roll may also have a relatively smaller coating thickness. Thus, it is possible to prevent cracking at the core portion.

In another aspect of the present disclosure, there is provided a lithium secondary battery which includes a cylindrical jelly roll including a strip-like electrode assembly wound cylindrically to form a hollow cavity at the core portion, wherein the strip-like electrode assembly has a structure in which a strip-like positive electrode, a strip-like separator and a strip-like negative electrode are stacked successively, and the strip-like positive electrode or the strip-like negative electrode is the strip-like electrode as defined in the present disclosure.

Herein, the cylindrical jelly roll is wound in a manner that a portion of the strip-like electrode assembly where the first electrode active material layer is exposed is positioned at the core portion of the cylindrical jelly roll.

In this manner, it is possible to reduce the loading amount and press rate at the core portion, and thus to prevent cracking at the core portion and degradation of performance of a lithium secondary battery.

Herein, a positive electrode tab is attached to the positive electrode of the cylindrical jelly roll and is positioned generally on the top end of a battery can to be connected to a cap assembly for sealing the battery can. A negative electrode tab is attached to the negative electrode to be connected to the bottom end of the battery can. Meanwhile, the lithium secondary battery may further include a center pin inserted to the core portion of the cylindrical jelly roll. There is no particular limitation in the diameter of the center pin. According to an embodiment, the center pin may have a diameter of 0.5-5.0 mm.

Herein, the length of the surface of the first electrode active material layer exposed to the outside may be 1-3 times of the length of the circumference of the center pin. As used herein, 'length of circumference of the center pin' means the circumferential length of a circle forming the horizontal section of a cylinder, when the center pin has a cylindrical form and the cylinder is cut in the horizontal direction. When the length of the surface of the first electrode active material layer exposed to the outside is less than 1 time of the length of the circumference of the center pin, the length of the electrode portion including the first electrode active material alone becomes excessively small so that the electrode portion cannot surround the center pin sufficiently. In this case, the electrode portion also including the second electrode active material layer surrounds the center pin and is positioned at the core portion, and thus it is not possible to obtain an effect of improving cracking at the core portion sufficiently. Further, when the length of the surface of the first electrode active material layer exposed to the outside is larger than 3 times of the length of the circumference of the center pin, the length of the portion having a low capacity per unit area, i.e., the electrode portion including the first electrode active material layer alone becomes excessively large to cause a decrease in battery capacity undesirably.

Meanwhile, the cylindrical jelly roll and an electrolyte are received in the battery can.

The electrolyte that may be used according to the present disclosure is a salt having a structure of $A^+B^-$, wherein $A^+$ includes $Li^+$, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto. Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Preparation of Slurry for First Positive Electrode Active Material Layer $LiNi_{0.6}Co_{0.2}Mn_{0.2}$ (LG Chem, HN601A) as a positive electrode active material, Carbon black (Denka, SB50L) as a conductive material, PVDF (Kureha, KF 7200) as a polymer binder were prepared at a weight ratio of 94:3:2.7. PVDF was dissolved in N-methyl pyrrolidone as a solvent to form a binder solution, and the active material particles and conductive material were introduced to the binder solution and then dispersed in a commercially available homogenizer at 3,000 rpm for 50 minutes to obtain slurry for the first positive electrode material.

Preparation of Slurry for Second Positive Electrode Active Material Layer $LiNi_{0.6}Co_{0.2}Mn_{0.2}$ (LG Chem, HN601A) as a positive electrode active material, Carbon black (Denka, SB50L) as a conductive material, PVDF (Kureha, KF 7200) as a polymer binder were prepared at a weight ratio of 96:3:0.3. PVDF was dissolved in N-methyl pyrrolidone as a solvent to form a binder solution, and the active material particles and conductive material were introduced to the binder solution and then dispersed in a commercially available homogenizer at 3,000 rpm for 50 minutes to obtain slurry for the second positive electrode material.

Slurry Coating

The slurry for the first positive electrode active material layer was applied to one surface of aluminum foil having a thickness of 17 μm at a loading amount of 330 mg/25 cm² to form the first positive electrode active material layer. Then, the slurry for the second positive electrode active material layer was applied onto the first positive electrode active material layer at a loading amount of 330 mg/25 cm² except a portion of the first positive electrode active material layer 120 to be exposed and having a length to wind around the center pin, which is a winding core member, two times, followed by drying and pressing. In this manner, a positive electrode was obtained. The first electrode active material layer and the second electrode active material layer had a thickness ratio of 5:5, and the weight ratio of the binder contained in the first positive electrode active material layer to the binder contained in the second positive electrode active material layer was 9:1.

Example 2

A positive electrode was obtained in the same manner as Example 1, except that the composition of the first positive electrode slurry according to Example 1 was prepared by using a weight ratio of the positive electrode active material:conductive material:binder of 94.75:3:2.25, and the composition of the second positive electrode slurry was prepared by using a weight ratio of the positive electrode active material:conductive material:binder of 96.25:3:0.75 so that the weight ratio of the binder contained in the first positive electrode active material layer to the binder contained in the second positive electrode active material layer was changed to 75:25 (weight basis).

Example 3

A positive electrode was obtained in the same manner as Example 1, except that the composition of the first positive electrode slurry according to Example 1 was prepared by using a weight ratio of the positive electrode active material:conductive material:binder of 96.2:3:1.8, and the composition of the second positive electrode slurry was prepared by using a ratio of the positive electrode active material:conductive material:binder of 95.8:3:1.2 so that the weight ratio of the binder contained in the first positive electrode active material layer to the binder contained in the second positive electrode active material layer was changed to 60:40 (weight basis).

Comparative Example 1

A positive electrode was obtained in the same manner as Example 1, except that the composition of the first positive electrode slurry according to Example 1 was prepared by using a weight ratio of the positive electrode active material:conductive material:binder of 95.2:3:1.5, and the composition of the second positive electrode slurry was prepared by using a ratio of the positive electrode active material:conductive material:binder of 95.8:3:1.5 so that the weight ratio of the binder contained in the first positive electrode active material layer to the binder contained in the second positive electrode active material layer was changed to 50:50 (weight basis).

Comparative Example 2

A positive electrode was obtained in the same manner as Example 1, except that the first electrode active material layer 120 was exposed by such a length that it was wound around the center pin 0.7 times.

Comparative Example 3

A positive electrode was obtained in the same manner as Example 1, except that the composition of the positive electrode slurry was prepared by using a weight ratio of the positive electrode active material:conductive material:binder of 95.2:3:1.5, and the slurry was applied to one surface of aluminum foil having a thickness of 17 μm at a loading amount of 660 mg/25 cm², followed by drying and pressing.

Test for Adhesion in Positive Electrode

Each of the positive electrodes according to Examples 1-3 and Comparative Examples 1-3 was cut into a size of 15×150 mm, and the coated surface of the positive electrode was attached onto slide glass with a double-sided tape to provide a specimen. The specimen was mounted to a universal test machine (UTM) for determining adhesion, and the force required for 180° peeling was measured. The results are shown in the following Table 1.

Test for Cracking in Positive Electrode

Each of the positive electrodes according to Examples 1-3 and Comparative Examples 1-3 was wound around a rod having a diameter of 2 mm. Next, electrode cracking or disconnection was observed by the naked eyes on the surface of the positive electrode active material layer at the winding core portion. The results are shown in the following Table 1. When even one crack or disconnection was observed on the surface of the positive electrode active material layer, it was determined that cracking occurred. When no cracking occurred, it was determined that cracking did not occur.

TABLE 1

|  | Ratio of binder in the first active material layer based on total binder content | Ratio of binder in the second active material layer based on total binder content | Length of the exposed first electrode active material (winding number) | Electrode adhesion (gf/20 mm) | Cracking (rod with diameter of 2 mm) |
|---|---|---|---|---|---|
| Ex. 1 | 90 | 10 | 2 | 29 | x |
| Ex. 2 | 75 | 25 | 2 | 22 | x |
| Ex. 3 | 60 | 40 | 2 | 12 | x |
| Comp. Ex. 1 | 50 | 50 | 2 | 8 | o |
| Comp. Ex. 2 | 90 | 10 | 0.7 | 27 | o |
| Comp. Ex. 3 | 100 | — (none) | — (none) | 7 | o |

As can be seen from the results of Examples 1-3, when the exposed surface of the first electrode active material layer has a length capable of winding around the center pin, there was no phenomenon of cracking at the core portion. As can be seen from Comparative Example 1, even when the length wound around the center pin is sufficient, however, use of the same amount of the binder in each of the first positive electrode active material layer and the second positive electrode active material layer causes migration of the binder toward the positive electrode surface while the electrode slurry is dried, resulting in a decrease in the ratio of the binder in the first positive electrode active material layer and degradation of the adhesion with the electrode current collector. As a result, the positive electrode active material particles present in the first positive electrode active material layer exposed in the longitudinal direction may be detached with ease undesirably.

In addition, when a high-loading electrode is formed by using a single electrode slurry, like Comparative Example 3, the binder migrates toward the electrode surface during the drying to cause non-uniform distribution of the binder, resulting in degradation of the electrode adhesion. Further, in this case, since the electrode having a larger thickness is wound around the center pin having a smaller diameter, cracking occurs at the core portion.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description. Therefore, the description proposed herein is just a preferable example for the purpose of illustrations only, not intended to limit the scope of the disclosure, so it should be understood that other equivalents and modifications could be made thereto without departing from the scope of the disclosure.

What is claimed is:

1. A strip-like electrode for use in a cylindrical jelly roll which comprises: a strip-like electrode assembly wound cylindrically to form a hollow cavity at a core portion thereof; and a center pin inserted into the core portion, the strip-like electrode comprising:
- a strip-like electrode current collector;
- a first electrode active material layer formed on at least one surface of the strip-like electrode current collector; and
- a second electrode active material layer formed on the first electrode active material layer,
- wherein the second electrode active material layer has a shorter length than a length of the first electrode active material layer so that a portion of one longitudinal surface of the first electrode active material layer is exposed,
- a binder contained in the first electrode active material layer and a binder contained in the second electrode active material layer are present at a weight ratio of from 90:10 to 60:40, and
- a length of an exposed surface of the first electrode active material layer is from 1 to 3 times of a length of the circumference of the center pin.

2. The strip-like electrode according to claim 1, wherein a ratio of a thickness of the first electrode active material layer to a thickness of the second electrode active material layer is 1:9 to 7:3.

3. The strip-like electrode according to claim 1, wherein a ratio of a thickness of the first electrode active material layer to a thickness of the second electrode active material layer is 3:7 to 6:4.

4. A lithium secondary battery comprising the strip-like electrode according to claim 1.

5. The lithium secondary battery according to claim 4, wherein the cylindrical jelly roll is wound such that a portion of the strip-like electrode assembly at which the first electrode active material layer is exposed is positioned at the core portion of the cylindrical jelly roll.

6. The lithium secondary battery according to claim 4, wherein the strip-like electrode is a strip-like positive electrode.

7. The strip-like electrode according to claim 1, wherein the strip-like electrode is a positive electrode.

8. The strip-like electrode according to claim 1, wherein the strip-like electrode is a negative electrode.

9. The strip-like electrode according to claim 1, wherein the electrode current collector is a negative electrode current collector having a thickness of 3-500 μm.

10. The strip-like electrode according to claim 1, wherein a total thickness of the first and second electrode active material layers is 10-300 μm.

11. A cylindrical jelly roll comprising the strip-like electrode according to claim 1.

12. The cylindrical jelly roll according to claim 11, wherein a ratio of a thickness of the first electrode active material layer to a thickness of the second electrode active material layer is 1:9 to 7:3.

13. The cylindrical jelly roll according to claim 11, wherein a ratio of a thickness of the first electrode active material layer to a thickness of the second electrode active material layer is 3:7 to 6:4.

14. The cylindrical jelly roll according to claim 11, wherein a total thickness of the first and second electrode active material layers is 10-300 μm.

\* \* \* \* \*